United States Patent [19]

Hong et al.

[11] Patent Number: 5,758,734
[45] Date of Patent: Jun. 2, 1998

[54] FOOT SYSTEM FOR JOINTED LEG TYPE WALKING ROBOT

[75] Inventors: Yeh Sun Hong; Chong Won Lee, both of Seoul, Rep. of Korea

[73] Assignee: Korea Institute Of Science And Technology, Seoul, Rep. of Korea

[21] Appl. No.: 587,742

[22] Filed: Jan. 19, 1996

[51] Int. Cl.$^6$ .................... B62D 57/032; B62D 57/02
[52] U.S. Cl. ................................................ 180/8.1; 901/1
[58] Field of Search ................... 180/8.1, 8.2, 8.3, 180/8.4, 8.5, 8.6; 901/1, 50

[56] References Cited

U.S. PATENT DOCUMENTS

| 4,324,302 | 4/1982 | Rabinovitch | 180/8.1 |
|---|---|---|---|
| 5,121,805 | 6/1992 | Collie | 180/8.1 |
| 5,416,393 | 5/1995 | Gomi et al. | 180/8.1 |
| 5,421,426 | 6/1995 | De Beaucourt et al. | 180/8.1 |
| 5,455,497 | 10/1995 | Hirose et al. | 180/8.6 |
| 5,551,525 | 9/1996 | Pack et al. | 180/8.6 |

OTHER PUBLICATIONS

Hironori Adachi et al., "Study on Underground Space Excavation Machine", Proceedings of the 9th International Symposium on Automation and Robotics in Construction, vol. 2, Jun. 1992.
Brochure of Plustech Oy (Finland).
Shigeo Hirose et al., "Design of Prismatic Quadruped Walking Vehicle Titan VI", Proceedings of the 5th International Conference on Advanced Robotics, p. 723, 1991.
Shuuji Kajita et al., "Study of Dynamic Biped Locomotion", Brochure of Mechanical Engineering Lab., Tsukuba, Japan.
Hironori Adachi et al., "Adaptive Gait for Quadruped Walking Robot Using Force Sensor", Proceedings of the International Conference on Intelligent Autonomous Systems, Feb. 1993.
Atsuo, Takanishi et al., "Realization of Dynamic Biped walking Stabilized by Trunk Motion on a Sagittally Uneven Surface", IEEE International Workshop on Intelligent Robots and Systems, pp. 323–330, 1990.
Nobuo, Uesugi et al., "Total System of Advanced Robot for Nuclear Power Plant Facilities", Proceedings of the International Symposium on Advanced Robot Technology, pp. 111–117, Mar. 1991.

Primary Examiner—Brian L. Johnson
Assistant Examiner—Gary Savitt
Attorney, Agent, or Firm—McDermott, Will & Emery

[57] ABSTRACT

An improved foot system for a jointed leg type walking robot capable of more stably walking on both even and uneven ground surfaces by providing a jointed leg type foot system with a front toe cylinder and a rear toe cylinder each communicated with a front toe assembly and a rear toe assembly. In addition, it is capable of more stably landing on uneven ground surface and absorbing landing impacts more efficiently, which includes a lower foot body; an upper foot body mounted on the top of said lower foot body; a gas accumulator formed within the lower foot body; a front toe assembly pivotally attached to a predetermined portion of the lower foot body; and a rear toe assembly pivotally attached to a predetermined portion of the lower foot body.

11 Claims, 8 Drawing Sheets

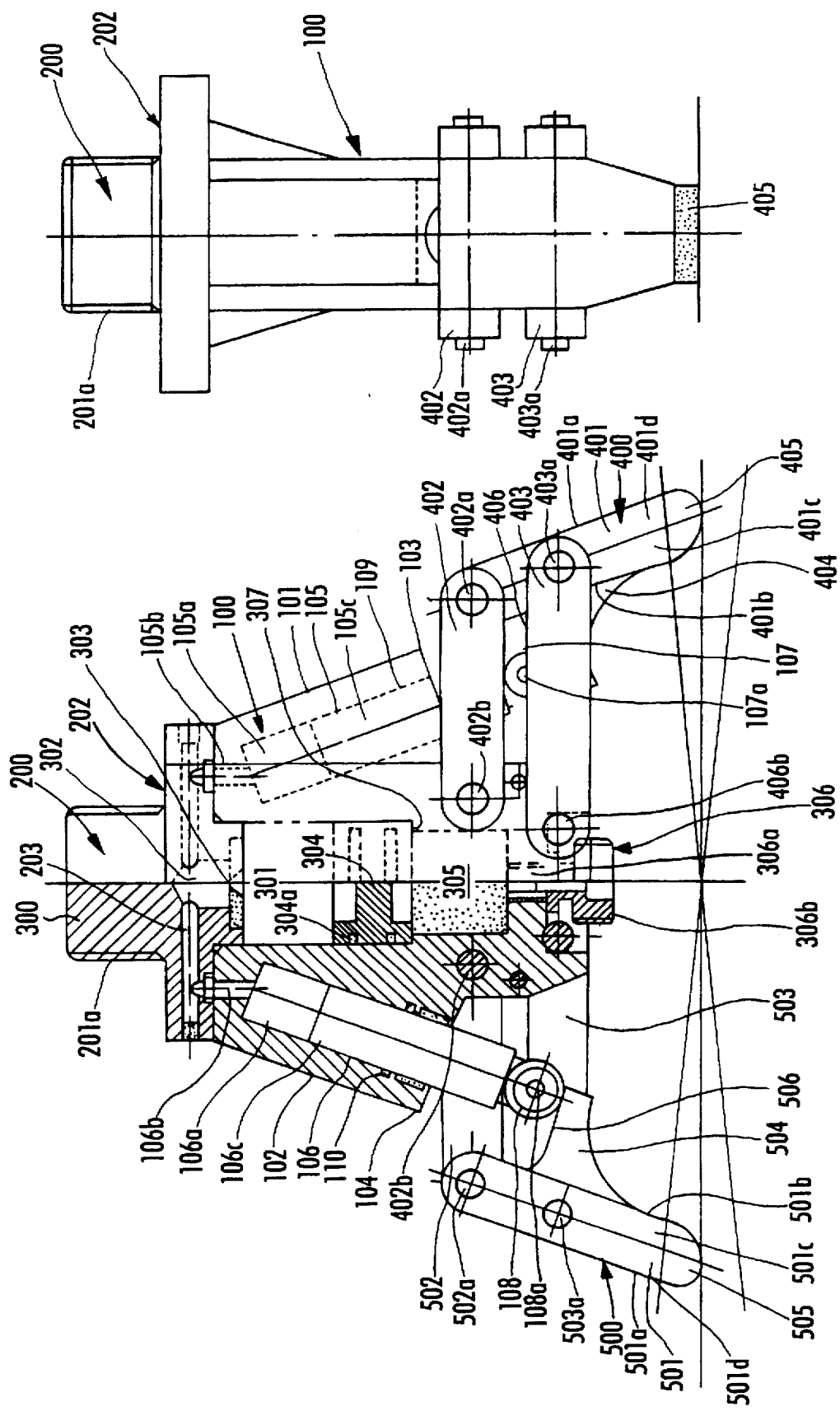

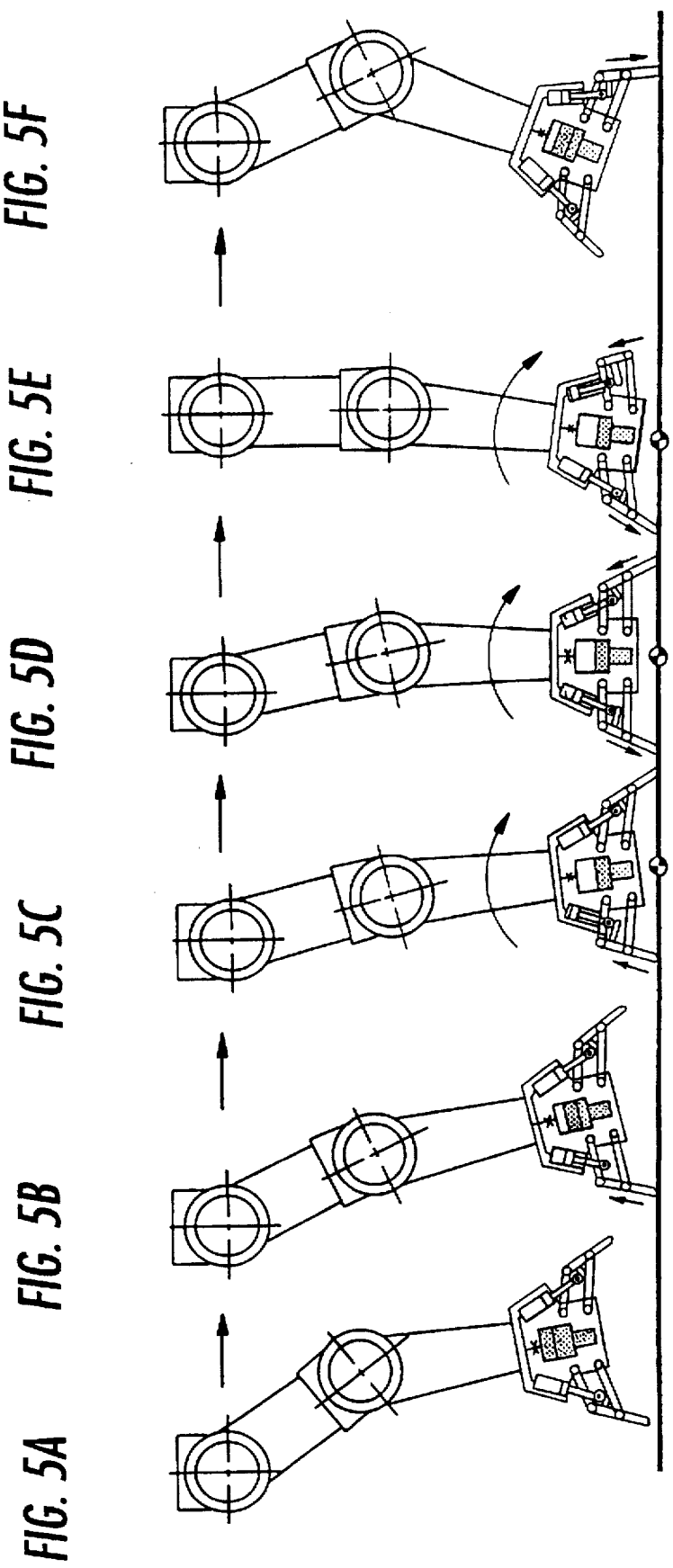

FOOT SYSTEM FOR JOINTED LEG TYPE WALKING ROBOT

BACKGROUND OF THE INVENTION

1. Field of the Invention

The present invention relates to a foot system for a jointed leg type walking robot, and particularly to an improved foot system for a jointed leg type walking robot capable of more stably walking on both even and uneven ground surfaces by providing a jointed leg type foot system with a front toe cylinder and a rear toe cylinder each communicated with a front toe assembly and a rear toe assembly, respectively.

2. Description of the Conventional Art

In the industrial field, the use of robots increases strongly for handling harmful chemicals, radioactive materials and the like which are very dangerous to humans. Among the methods of enabling a robot to move upon the ground, a method of using a jointed leg type walking system has been introduced. For the jointed leg type foot system, a flat or circular plate has been used, however the trial of improving the structure of a foot system is not introduced.

Referring to FIG. 1, there is shown a construction of a conventional jointed leg type walking robot. As shown therein, the robot is provided with a head 1 equipped with a visual sensor 2 mounted at a predetermined portion thereof. An upper body 3, a predetermined upper portion of which is pivotally connected to a predetermined portion of the head 1, is provided with a pair of arms 4. One end of each arms 4 is pivotally connected to a respective side of the upper body 3 and the other ends thereof are each pivotally provided with a hand 5. A bottom surface of the upper body 3 is rotatably connected to a predetermined portion of a lower body 6. A front waist joint 7 is rotatably connected to a predetermined forward portion of the lower body 6. A rear waist joint 8 is also rotatably connected to a predetermined rearward portion of the lower body 6. An upper end of each of a pair of front hip joints 9 is pivotally connected to a predetermined portion of the front waist joint 7 and a lower end of each front hip joints is pivotally connected to a front knee joint 10 which is also pivotally connected to a front ankle joint 11. Here, each front ankle joint 11 is pivotally provided with a front foot 12, the bottom surface of which is directed to contacting with an even ground surface 17. Meanwhile, the rear legs consists of the same structure as the front legs, so the descriptions thereof are omitted.

What kind of problem a jointed leg type walking robot with conventional foots can have, will now be explained with reference to FIG. 1 and FIGS. 2A to 2D.

To begin with, the robot performs some task in accordance with a control signal outputted from a microcomputer (not shown) mounted at a predetermined portion thereof, receiving a visual signal outputted from the visual sensor 2. Here, the walking operation of the robot is also conducted by a combined moving operation of the front/rear waist joints 7 and 8, the front/rear hip joints 9 and 13, and the front/rear knee joints 10 and 14, the front/rear ankle joints 11 and 15, and the front/rear feet 12 and 16. Here, since each foot 12, 16 is pivotally connected to each ankle joint 11, 15, it is generally required that each of the bottom surfaces thereof is always facing parallel with the even ground surface, so that the stable walking operation without slippage on the ground surface can be achieved.

However, as are well shown in FIGS. 2A to 2D, the conventional foot system has disadvantages in that the robot often slips on uneven ground surfaces due to its pivotal moment at the front/rear ankle joints 11 and 15, which occurs when a foot 12, 16 lands on an uneven ground surface or moves the body forwards during the support phase.

SUMMARY OF THE INVENTION

Accordingly, it is an object of the present invention to provide a foot system for a jointed leg type walking robot.

It is another object of the present invention to provide an improved foot system for a jointed leg type walking robot capable of more stably walking on both even and uneven ground surfaces by providing a jointed leg type foot system with a front toe cylinder and a rear toe cylinder each communicated with a front toe assembly and a rear toe assembly. In addition, it is capable of more stably landing on uneven ground surface and absorbing landing impacts more efficiently.

To achieve the above objects, there is provided a foot system for a jointed leg type walking robot, which includes a lower foot body; an upper foot body mounted on the top of said lower foot body; a gas accumulator formed within the lower foot body; a front toe assembly pivotally attached to a predetermined portion of the lower foot body; and a rear toe assembly pivotally attached to a predetermined portion of the lower foot body.

BRIEF DESCRIPTION OF THE DRAWINGS

FIG. 3A is a front cross-sectional view showing a foot system of a jointed leg type 4-legged walking robot according to the present invention.

FIG. 3B is a side view of FIG. 3A showing a foot system of a jointed type 4-legged walking robot according to the present invention.

FIGS. 5A to 5F are views showing a landing phase and a support phase of the foot system according to the present invention.

DETAILED DESCRIPTION OF THE INVENTION

Figure 1:
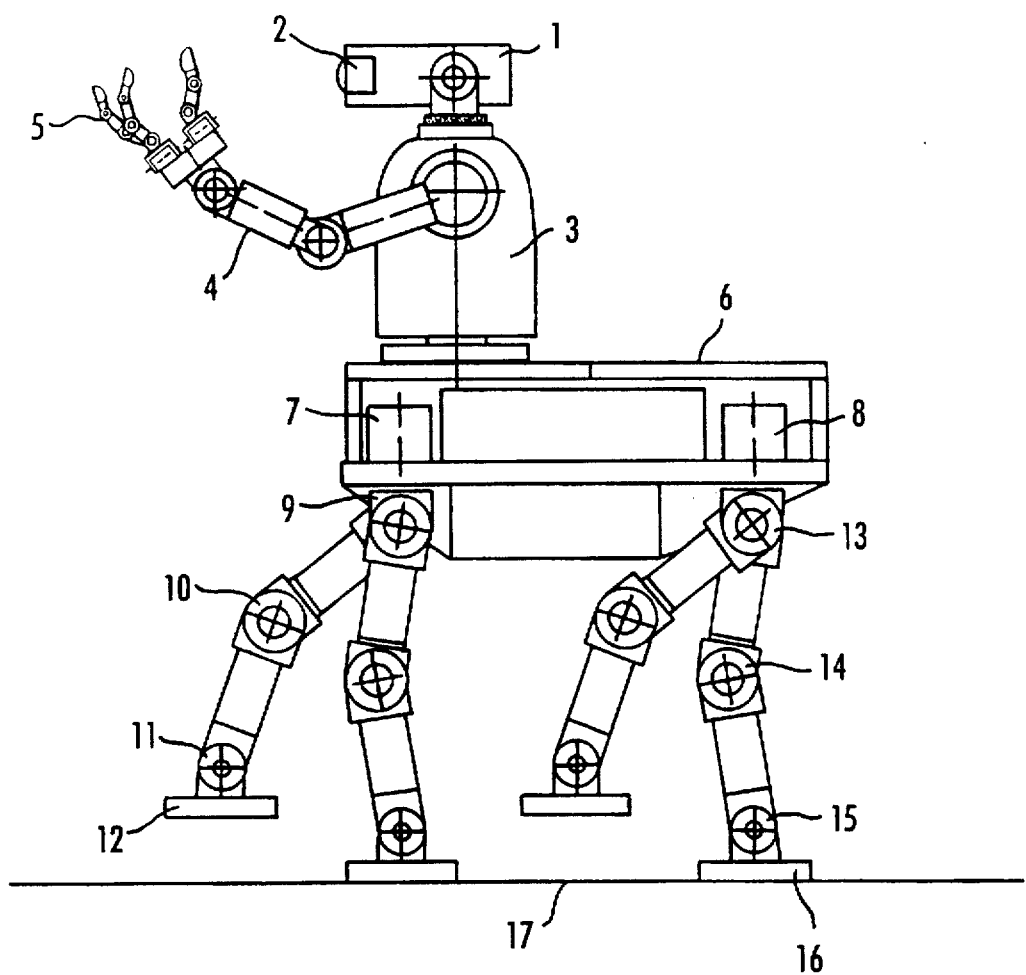
FIG. 1 is a perspective view showing a construction of a conventional jointed leg type 4-legged walking robot.
Figure 2A:
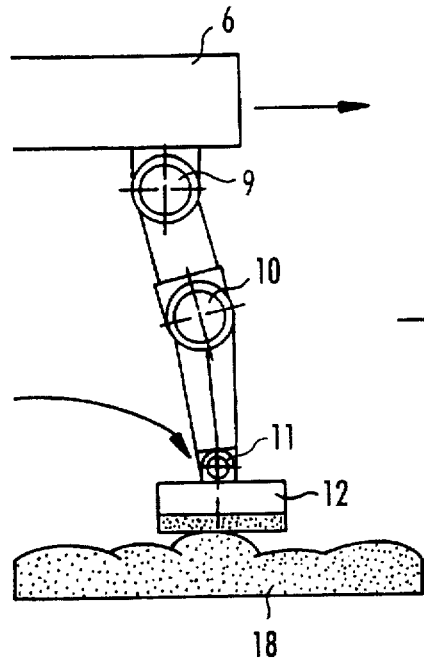
FIGS. 2A to 2D are views showing disadvantages of a conventional foot for a jointed leg type 4-legged walking robot.
Figure 2B:
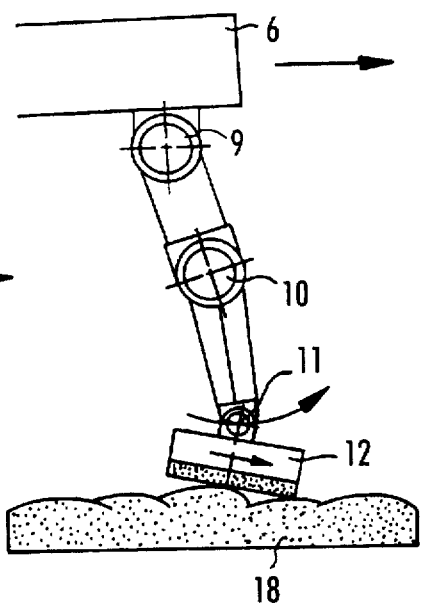
Figure 2C:
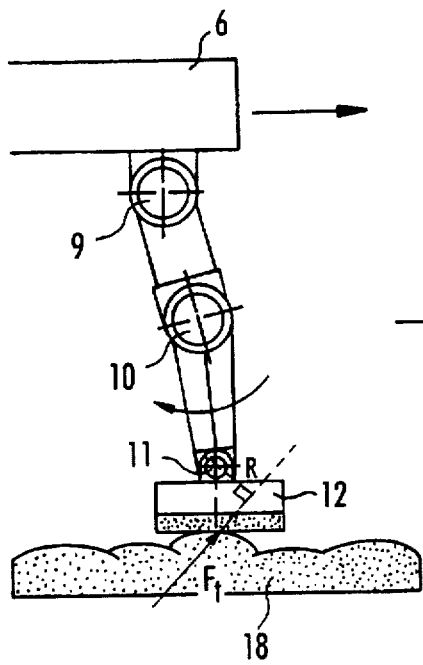
Figure 2D:
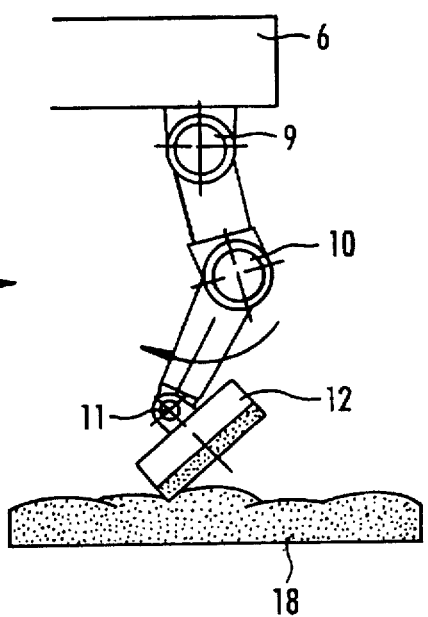

Referring to FIG. 3, a foot system for a jointed leg type 4-legged walking robot is provided with a lower foot body 100, an upper foot body 200 fitted to the lower foot body 100, a gas accumulator 300 centrally downwardly formed within the lower foot body 100, a front toe assembly 400, and a rear toe assembly 500.

The front and rear sides of the lower foot body 100 are respectively provided with integrally shortened and downwardly and outwardly extending front and rear bracket portions 101, 102, the upwardly and outwardly angled bottom surfaces of which define front and rear shoulders 103, 104 with the recessed lower outer peripheral surface of the lower foot body 100. Within each front and rear bracket portions 101, 102 there are centrally formed a downwardly and outwardly inclined front and rear toe cylinder 105, 106 each opened at their bottom end to the thusly defined front shoulder 103 (not shown) and rear shoulder 104, and having their closed upper ends each communicated with front and rear oil lines 105b, 106b to the upper surface of the lower foot body 100 atop which abuts the bottom surface of a horizontally formed oil path section 202 of the upper foot body 200.

The upper foot body 200 includes an engaging section 201 having a threaded portion 201a which is formed on the outer circumferential surface thereof and an oil path section 202 integrally formed with the engaging section 201.

Here, the oil path section 202 includes an oil path 203 horizontally formed within the oil path section 202, the front and rear portion of which is & communicated with each of front and rear toe cylinder oil chambers 105a, 106a of the front and rear toe cylinders 105, 106 through a front and rear oil lines 105b, 106b. In addition, the central portion of the oil path 203 is connected to a gas accumulator oil chamber 301 through a central oil line 302 and a damping orifice 303 in order.

A gas accumulator 300 is centrally provided within the lower foot body 100. A gas accumulator oil chamber 301 is formed in the upper portion thereof. A piston 304 having a pair of piston rings 304 inserted onto an outer circumferential surface thereof reciprocates in the gas accumulator 300. A gas chamber 305 is formed below the piston 304. A gas chamber shoulder 307 is formed between the gas accumulator oil chamber 301 and the gas chamber 305 so as to limit the movement of the piston 304.

A gas filling assembly 306 including a gas filling port 306a connected between the gas chamber 305 and the sealing screw 306b and mounted on the bottom thereof is provided below the gas chamber 305 for charging gas into the gas chamber 305.

In addition, each outwardly downwardly formed toe cylinder 105, 106 includes cylinder oil chambers 105a, 106a centrally formed therewithin. Each toe piston 105c, 106c is disposed in each toe cylinder 105, 106, respectively. A front/rear toe rollers 107, 108 each rotatably engaged with a front/rear roller pins 107a, 108a are disposed on each bottom of the front and rear toe pistons 105c and 106c. The circumferential surfaces of the front/rear toe rollers 107, 108 come into rolling contact with a front/rear toe bracket guide surfaces 406, 506. In addition, seals 109, 110 are respectively mounted on an inner circumferential surface of each toe cylinder 105, 106 within the lower foot body 100.

A front toe assembly 400 is disposed in front of the lower foot body 100, and a rear toe assembly 500 is disposed behind the lower foot body 100. The front toe assembly 400 includes a downwardly outwardly standing front toe 401. Here, the front/rear toe 401, 501 has a front/rear toe front side 401a, 501a, a front/rear toe rear side 401b, 501b, a front/rear toe first side 401c, 501c, and a front/rear toe second side 401d, 501d (not shown). The upper end of the front/rear toe 401, 501 is pivotally connected to one end of the front/rear toe upper link 402, 502 by a front/rear toe first upper pin 402a, 502a. The other end of the front/rear toe upper link 402, 502 is also pivotally connected to a predetermined portion of the lower foot body 100 by a front/rear toe second upper pin 402b, 502b. A predetermined portion of the front/rear toe 400, 500 is pivotally connected to one end of a front/rear toe lower link 403, 503 by a front/rear toe first lower pin 403a, 503a. The other end of the front/rear toe lower link 403, 503 is also pivotally connected to a predetermined portion of the lower foot body 100 by a front/rear toe second lower pin 403b, 503b.

A downwardly outwardly extended front/rear toe bracket 404 (not shown), 504 having a downwardly inwardly slanted front/rear toe roller guide 404a, 504a, on which the front/rear toe rollers 107, 108 come into rolling contact, is mounted on the front/rear toe rear side 401b, 501b.

On each of the front/rear toes 401, 501, a tip 405, 505 is attached to each of the front/rear toes 401, 501 to protect the front/rear toes 401, 501 from the shock damages caused when the robot walks on the ground surface.

To begin with, an operation of a foot system for a jointed leg type 4-legged walking robot according to the present invention will now be explained with reference to FIGS. 4A through 4E.

Figure 4A:
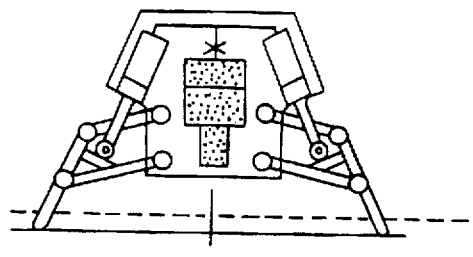
FIGS. 4A to 4E are views showing an operation of a foot system according to the present invention, and in particular showing a relationship between the location of a gas piston and a toe variation.
Figure 4B:
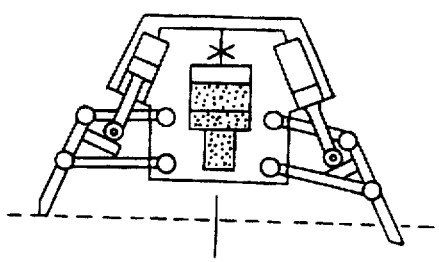
Figure 4C:
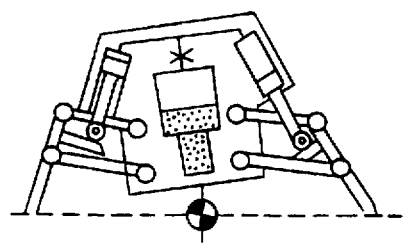
Figure 4D:
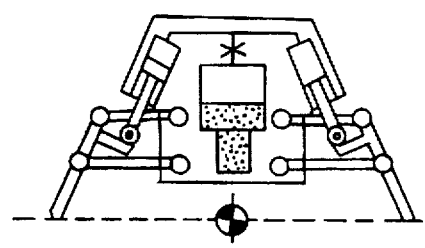
Figure 4E:
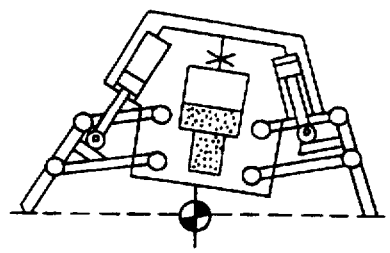

Of which, FIG. 4A shows the foot system when the foot is lifted during the leg-swing phase of the leg and the front and rear toe assembly thereof are fully extended by the gas pressure. FIG. 4B shows the foot system when the rear toe is pushed upwards to its neutral position. Then, the oil is forced to flow from rear toe cylinder 106 to the gas accumulator 300 through the damping orifice 303. In this case, the gas accumulator piston moves downwards to its middle position from the upper limit, compressing the gas. FIG. 4C shows the foot system when the rear toe is pushed upwards to its upper limit making the gas accumulator piston move to its lower limit by the discharged oil from the rear toe cylinder 106. Since the gas accumulator piston is at its lower limit, the front toe 401 can not be pushed upwards. But the foot can be rotated without restriction, as the oil can flow from the front toe cylinder 105 into the rear toe cylinder 106 freely. FIG. 4D shows the foot system when both the front and rear toes 401 and 501 are in the neutral position. When e.g. the foot is rotated clockwise to its upright position in FIG. 4C with the gas accumulator piston at its lower limit. FIG. 4E shows the foot system when the foot is rotated further in FIG. 4, making the rear toe 501 moves to its lower limit and the front toe 401 moves to its upper limit also with the gas accumulator piston at its lower limit. It is to be noted that the imaginary connecting line between the two toe tips has the center of rotation at its middle position during the change of the state from FIG. 4C through FIG. 4E.

In addition, FIG. 5A through FIG. 5F show an operation of the foot system and a leg of the robot according to the present invention.

Of which, FIG. 5A shows the foot system when the fully lifted foot is on the point of landing after the swing phase of the leg, the working state of the foot is shown in FIG. 4A. FIG. 5B shows the foot system when the foot is at the beginning of the landing phase. The rear toe touches the ground at first and is pushed upwards by the weight of the robot body as shown in FIG. 4B. During this working phase of the foot the landing impact energy will be changed into heat energy by the damping orifice 303 through which the oil from the rear toe cylinder 106 flows into the accumulator. The amount of the absorbed energy is proportional to the oil flow rate through the damping orifice 303 multiplied by the pressure drop across it, which in return proportional to the square root of the flow rate. FIG. 5C shows the foot system when the foot is completely landed using the rear toe. The working state of the foot us shown in FIG. 4C and the landing impact absorbing function of the foot is no more effective. The initial charge pressure of the gas chamber 305 should be determined so that the pressure of the gas chamber 305 can keep the equilibrium with the load pressure by the body weight, when its volume is minimum. FIG. 5D shows the foot system when the leg and the foot are rotated clockwise to its upright position during the supporting phase of the foot. The working state of the foot is shown in FIG. 4D. FIG. 5E shows the foot system when the foot is rotated further at the end of the supporting phase. The working state of the foot is shown in FIG. 4E. FIG. 5F shows the foot system when the foot is at the beginning of the swing phase of the leg. The working state of the foot is similar to that shown in FIG. 4A, except that the front toe 401 is in its neutral position.

FIGS. 6A through 6D show an operation of the foot system and a leg of the robot on uneven ground surface according to the present invention.

Figure 6A:
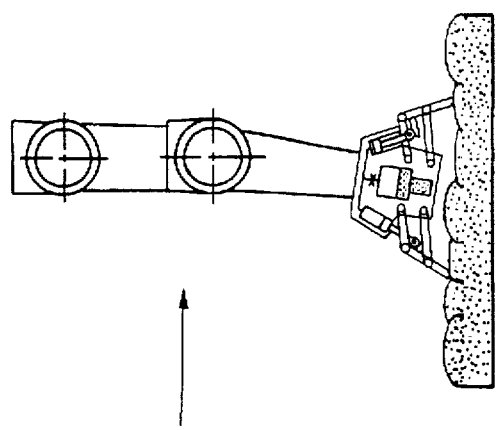
FIGS. 6A to 6D are views showing an operation of the foot system according to the present invention when the robot walks on an uneven ground surface.
Figure 6B:
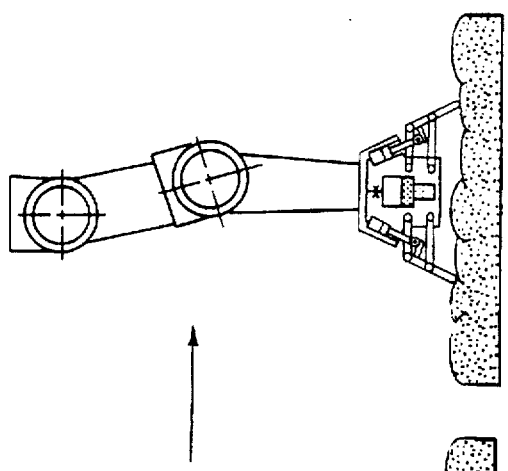
Figure 6C:
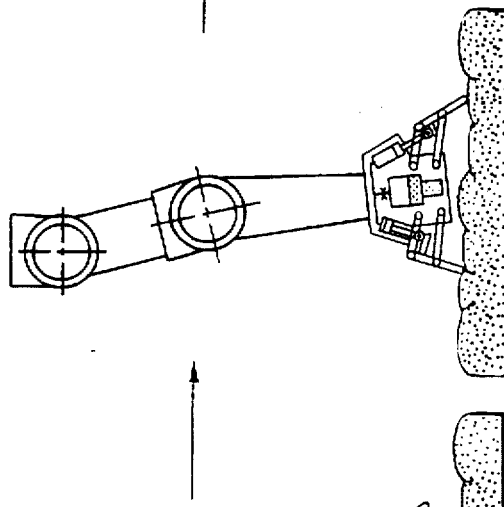
Figure 6D:
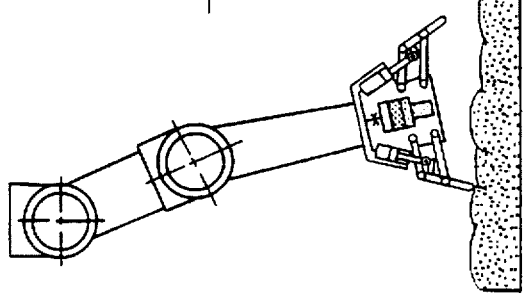

Of which, FIG. 6A shows the foot system when the foot is at the beginning of the landing phase as shown in FIG. 5B. The rear toe can be landed on uneven surface safe and firm with high probability, since it contacts the ground surface with small area. FIG. 6B shows the foot system when the foot is completely landed using the front and rear toes 401 and 501 as shown in FIG. 5C, similar to the rear toe, the front toe 401 also can be landed on uneven surface safe and slipless with high probability. FIG. 6C shows the foot system when the leg and the foot are rotated clockwise to its upright position during the supporting phase of the foot as shown in FIG. 5D. Since the center of rotation of the foot lies on the ground surface, the contact points of the front and rear toe with the ground surface remain unchanged. FIG. 6D shows the foot system when the foot is rotated further at the end of the supporting phase as shown in FIG. 5E.

Figure 7:
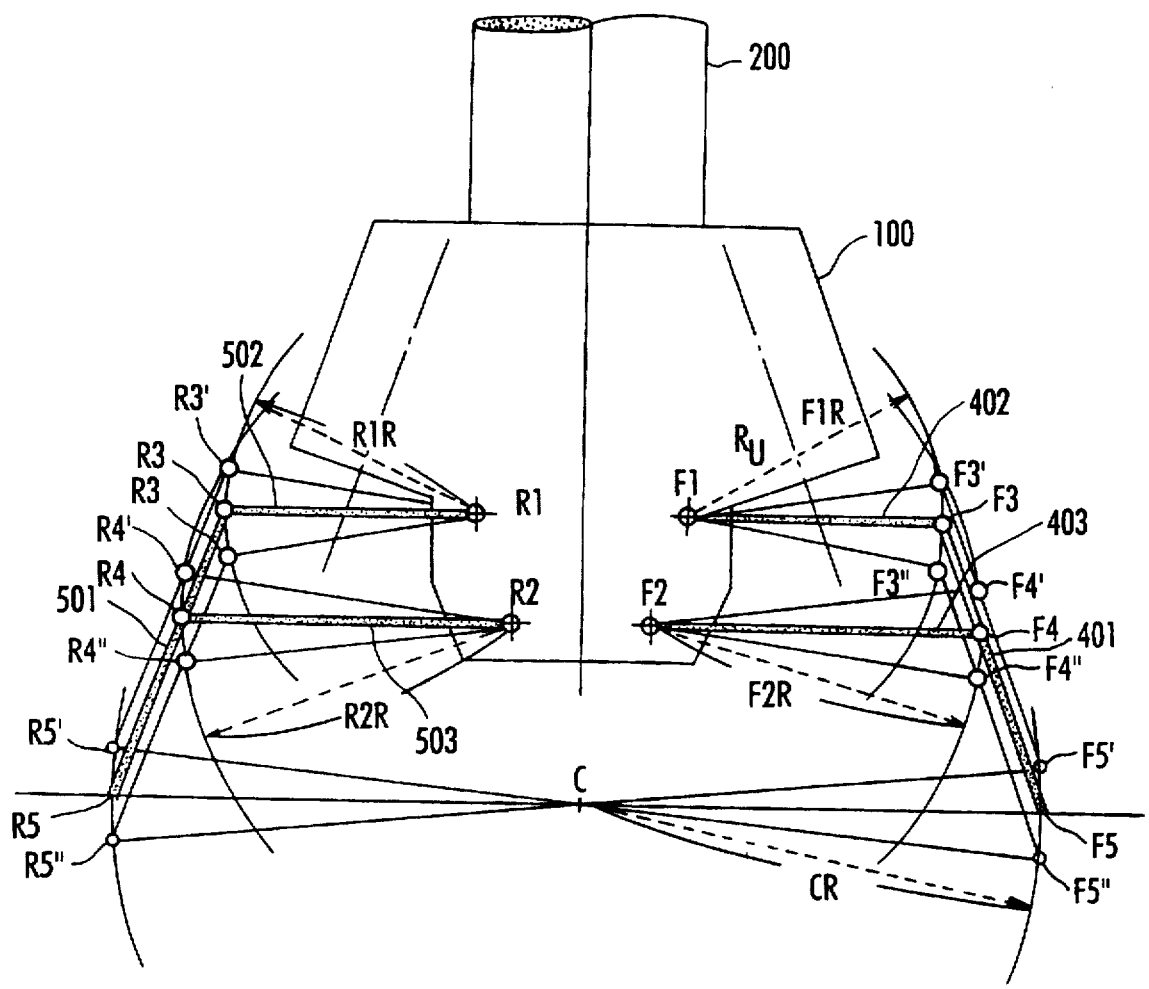
FIG. 7 is a trajectory view of front and rear toe assembly of the foot system according to the present invention.

Next, FIG. 7 shows a trajectory of a movement of each toe assembly of the foot system according to the present invention.

As shown therein, F1 denotes a point of the front toe second upper pin 402b, F2 denotes a point of the front toe second lower pin 403b, F3, F3', F3" denote points of the front toe first upper pin 402a, F4, F4', F4" denote points of the front toe first lower pin 403a, and F5, F5', F5" denote bottom end points of the front toe 400. In addition, F1R denotes a radius distance between F1 and F3. F2R denotes a radius distance between F2 and F4.

Meanwhile, R1 denotes a point of the rear toe second upper pin 502b, R2 denotes a point of the rear toe second lower pin 503b, R3, R3', R3" denote points of the rear toe first upper pin 402a, R4, R4', R4" denote points of the rear toe first lower pin 503a, and R5, R5', R5" denote bottom end points of the rear toe 500. In addition, R1R denotes a radius distance between R1 and R3. R2R denotes a radius distance between R2 and R4. In addition, "C" denotes a center between F5, F5', F5" and R5, R5', R5".

The operation of the foot system of the robot with above described points will now be explained.

When the foot is fully lifted during the swing phase of the leg, the front and rear toe are fully extended as shown in FIG. 4A. At this time, FIG. 3 and R3 move downwards up to the point of F3" and R3" with having the radius of F1R and R1R, respectively. At the same time, F4 and R4 move downwards up to the points of F4" and R4" with having the radius of F2R and R2R, respectively.

When the robot body's weight is applied to the rear toe 501 during the landing phase of the foot, as shown in FIG. 4B and FIG. 4C, R3" move up to the point of R3' via R3 with the radius of R1R. R4" moves up to the point of R4' via R4 with the radius of R2R. R5" moves up to the point of R5' via R5 with the radius of CR.

When the robot body's weight is applied to the rear toe 501 and front toe 401 equally and the foot is standing vertically during the supporting phase, as shown in FIG. 4D, R3' moves to the point of R3 with the radius of R1R. R4' moves to the point of R4 with the radius of R2R. R5' moves up to the point of R5 with the radius of CR. On the contrary, F3" moves up to the point of F3 with the radius of F1R. F4" moves up to the point of F4 with the radius of F2R. F5" moves up to the point of F5 with the radius of CR.

When the robot body's weight is applied to the front toe 401 at the end of the support phase, as shown in FIG. 4E, R3 moves to the point of R3" with the radius of R1R. R4 moves to the point of R4" with the radius of R2R. R5 moves up to the point of R5" with the radius of CR. On the contrary, F3 moves up to the point of F3' with the radius of F1R. F4 moves up to the point of F4' with the radius of F2R. F5 moves up to the point of F5' with the radius of CR.

In this way described above, the foot has its center of rotation located on the ground surface which allows the elimination of the ankle joint, the contact points of the toes with ground surface do not change during the rotation of the foot, and the contact angle between the toe pistons and the toe bracket guiding surface can be kept nearly 90 degree during the movement of toes so that the toe pistons can be free of the side reaction force from toes which can cause sticktion of the piston. As the trajectory of the toe movement lies within a narrow band, the hydraulic force of the toe pistons acting on the top tips remains almost constant during the rotation of the foot, which assures same supporting force of the front and rear toes.

Figure 8:
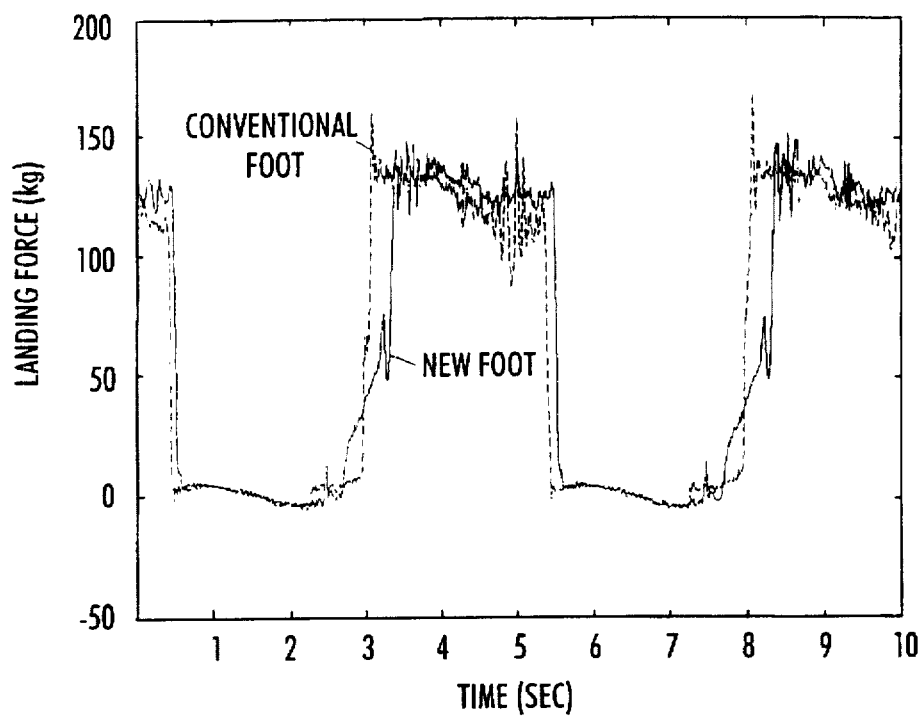
FIG. 8 is an experimental result showing the landing-shock-absorbing offset of the foot according to the present invention.

FIG. 8 shows an example of experimental results obtained by the measurement of the landing force on the foot when a jointed-leg type foot is walking with a conventional foot in the form of a circular plate, and with the foot according to the present invention.

Figure 9:
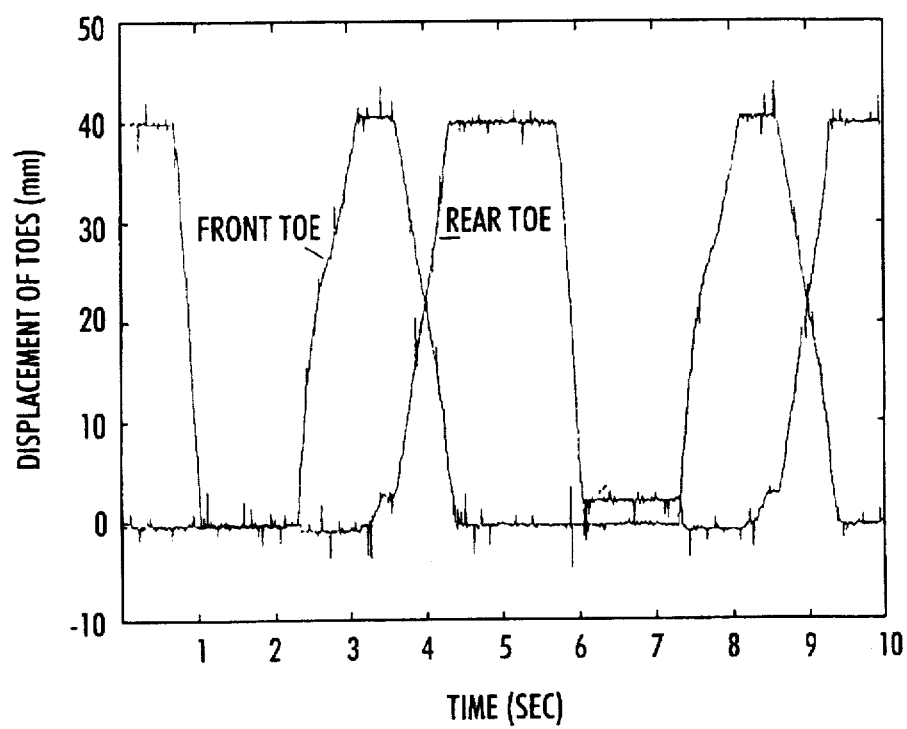
FIG. 9 is an experimental result showing the change of the displacement of the toes during the landing and support phase according to the present invention.

As is shown, in the case of the conventional foot is the form of circular plate the landing force indicates sharper increasing rate and higher peak value than the foot according to the present invention. FIG. 9 shows the movement of the toes under the same experimental condition. As is shown, firstly, the rear toe moves upwards when it touches the ground and during the rotation of the foot, the rear toe moves downwards while the front toe moves upwards.

Although the preferred embodiments of the present invention have been disclosed for illustrative purposes, those skilled in the art will appreciate that various modifications, additions and substitutions are possible, without departing from the scope and spirit of the invention as described in the accompanying claims.

What is claimed is:

1. A foot system for a jointed leg walking robot, comprising:
 a lower foot body including front/rear toe cylinders mounted therewithin;
 an upper foot body mounted on the top of said lower foot body;
 a gas accumulator formed within the lower foot body;
 a front toe assembly pivotally attached to a predetermined portion of the lower foot body by front toe upper and lower linking means, said front toe upper and lower link means being substantially parallel to each other; and a rear toe assembly pivotally attached to a predetermined portion of the lower foot body by rear toe upper and lower linking means, said rear toe upper and lower link means being substantially parallel to each other;

wherein each of said rear toe linking means and said front toe linking means move independently in an upward/ downward direction, thereby to move said front toe and said rear toe substantially in parallel to an imaginary longitudinal center line of said front/rear toe cylinders, respectively, and a path traced by an upward/downward movement of bottom end points of the front/rear toes is in a shape of an arc, whereby a focal point of said arc shaped path traced by said movements thereof is substantially located on the ground surface.

2. The foot system of claim 1, wherein each of said front/rear toe cylinders includes a piston reciprocating therewithin and a cylinder shaft one end of which is connected to said piston and the other end of which is rotatably provided with a toe roller.

3. The foot system of claim 1, wherein each of said front/rear toe cylinders includes a cylinder oil chamber charged with oil, and said upper foot body includes a cylindrical engaging section and an oil path section, said oil path section being horizontally formed therewithin and including an oil path one end of which is connected to the front cylinder oil chamber via a front oil line and the other end of which is connected to the rear cylinder oil chamber via a rear oil line.

4. The foot system of claim 3, wherein said oil path includes a central oil line connected to a predetermined portion thereof, the lower end of which is provided with a damping orifice for controlling an oil flow.

5. The foot system of claim 1, wherein said gas accumulator includes a gas accumulator oil chamber formed therein, a piston inserted therein, a gas chamber formed below the piston, and a gas filling assembly provided for charging/ discharging gas into/from the gas chamber.

6. The foot system of claim 5, wherein between said gas accumulator oil chamber and said gas chamber a shoulder is formed to limit a movement of a piston.

7. The foot system of claim 1, wherein said front toe assembly includes an outwardly vertically standing front toe having a front toe front side, a front toe rear side, a front toe first side, and a front toe second side.

8. The foot system of claim 1, wherein said rear toe assembly includes an outwardly vertically standing rear toe having a rear toe front side, a rear toe rear side, a rear toe first side, and a rear toe second side.

9. The foot system of claim 1, wherein said each of front/rear toe assemblies includes a tip mounted on each bottom thereof to prevent a predetermined impact when the robot walks between the front/rear toes and the ground surface.

10. A foot system for a jointed leg walking robot, comprising:

a lower foot body;

an upper foot body mounted on the top of said lower foot body;

a gas accumulator formed within the lower foot body;

a front toe assembly pivotally attached to a predetermined portion of the lower foot body; and a rear toe assembly pivotally attached to a predetermined portion of the lower foot body, wherein said upper foot body includes a cylindrical engaging section and an oil path section.

11. A foot system for a jointed leg walking robot, comprising:

a lower foot body;

an upper foot body mounted on the top of said lower foot body;

a gas accumulator formed within the lower foot body;

a front toe assembly pivotally attached to a predetermined portion of the lower foot body; and a rear toe assembly pivotally attached to a predetermined portion of the lower foot body, wherein said gas accumulator includes a gas accumulator oil chamber formed therein, a piston inserted therein, a gas chamber formed below the piston, and a gas filling assembly provided for charging/ discharging gas into/ from the gas chamber.

* * * * *